United States Patent [19]

Kita et al.

[11] Patent Number: 4,551,256

[45] Date of Patent: Nov. 5, 1985

[54] SLURRY EXCAVATING METHOD

[75] Inventors: Daizo Kita, Niiza; Tsutomu Nakamura, Sakai; Takeshi Kawachi, Tokorozawa, all of Japan

[73] Assignees: Ohbayashi-Gumi, Ltd., Osaka; Kuraray Co., Ltd., Okayama, both of Japan

[21] Appl. No.: 384,175

[22] Filed: Jun. 2, 1982

[30] Foreign Application Priority Data

Jun. 9, 1981 [JP] Japan .................................. 56-89237
Nov. 9, 1981 [JP] Japan ................................ 56-180467

[51] Int. Cl.$^4$ ............................................. C09K 7/02
[52] U.S. Cl. .............................. 252/8.5 LC; 175/72; 405/264
[58] Field of Search .................... 252/8.5 LC, 8.5 C; 175/72; 405/264

[56] References Cited

U.S. PATENT DOCUMENTS

| | | | |
|---|---|---|---|
| 2,718,497 | 9/1955 | Oldham | 252/8.5 C |
| 2,775,557 | 12/1956 | Morgan | 252/8.5 C |
| 2,810,716 | 10/1957 | Markus | . |
| 3,208,524 | 9/1965 | Horner et al. | 252/8.5 LC |
| 3,215,634 | 11/1965 | Walker | 252/8.5 LC |
| 3,353,601 | 11/1971 | Dollarhide et al. | 175/72 X |
| 3,371,712 | 3/1968 | Adams | 252/8.5 LC |
| 4,182,417 | 1/1980 | McDonald et al. | 252/8.5 C |
| 4,257,903 | 3/1981 | Kucera et al. | 252/8.5 C |
| 4,353,804 | 10/1982 | Green et al. | 252/8.5 C |
| 4,382,999 | 5/1983 | Harima et al. | 428/492 |

*Primary Examiner*—Herbert B. Guynn
*Attorney, Agent, or Firm*—Wenderoth, Lind & Ponack

[57] ABSTRACT

A slurry excavating method for excavating the ground or drilling a hole using excavating slurry containing a powder of water absorbing resin. This method makes it easy to prevent the slurry from flowing into gaps in the ground or cracks in fractured shale layer or fissile layer while excavating the ground.

7 Claims, 2 Drawing Figures

SLURRY EXCAVATING METHOD

BACKGROUND OF THE INVENTION

1. Field of the Invention

The present invention relates to a method for excavating the ground or drilling a hole in the ground through utilization of a slurry. More particularly, the invention pertains to a slurry excavating method which employs a slurry containing a water absorbing resin powder and which permits excavation of the ground or drilling a hole while preventing the so-called loose water phenomenon wherein the slurry is lost in gaps in the ground or cracks in a shuttered shale layer, fissile layer or the like.

2. Description of the Prior Art

For excavating the ground or drilling a hole in the ground through the use of a slurry, there have heretofore been proposed a continuous underground wall method, various piling methods, a slurry pressurized shield method and various boring methods. With such methos, a ditch (or hole) being drilled or a cutting area is filled with a slurry and a water sealing mud cake of slurry components is formed on the wall surface of the ditch or in the cutting area that makes contact with the slurry and, as a result of this, the pressure of the slurry acts on the natural ground to prevent crumbling of the ditch wall or cutting area. The slurry heretofore employed is produced by suspending and dissolving in water one or more kinds of clays, such as bentonite, natural or synthetic high molecular weight substances and potter's clay. The slurry is held in a state of good fluidity such as a viscosity of 5 to 50 cps. and a specific gravity of about 1.05 so as to facilitate its supply and recovery and subsequent steps, such as concrete placing and so on. On account of such high fluidity, when the nature of the ground being excavated or drilled is gravel or is cracked, imperfect mud cakes are formed in coarse gaps of the gravel or the cracks, resulting in what is called a loose or lost water phenomenon, whereby the slurry percolates downward through the surrounding soil in large quantities. A decrease in the slurry pressure by the lost water phenomenon in the ditch being drilled or in the cutting area leads to the crumbling of the ditch wall and pollution of surrounding underground water. Therefore, prevention of the lost water phenomenon is indispensable to the slurry excavating method and a variety of countermeasures have hitherto been proposed. One method that has been employed is to add to the slurry lost water preventive materials, such as cottonseeds, sawdust, pulp, chrisotile, mica and so forth. The kinds and concentrations of such materials are determined in consideration of the kind of slurry used, but these materials are defective in that they surface or precipitate and do not stably disperse in the slurry because they appreciably differ in specific gravity from the slurry.

Recently there has been proposed in Japanese Pat. Laid-Open No. 92508/76 a method that prevents the lost water phenomenon by adding to an excavating slurry water soluble high molecular weight substances having a mannose radical at its cis-position in combination with boric acid (salt) to thereby gelatinize the slurry containing the water soluble high weight compound.

With this method, however, since the property of a gel formed in the slurry varies with atmospheric or water temperature, or the nature of water, field work becomes complex. In addition, since the viscosity and specific gravity of the excavating slurry are confined within narrow limits as referred to previously, the quantities of the water soluble high weight material and a hardening agent added must be small. This reduces the quantity of the gel formed and decreases the gel strength and, consequently, the gel formed flows out through voids in the gravel, resulting in the effect of lost water prevention not being as effective as expected.

SUMMARY OF THE INVENTION

It is therefore an object of the present invention to provide a slurry excavating method which permits excavating the ground or drilling a hole in the ground without occurrence of the lost water phenomenon.

Another object of the present invention is to provide an excavating slurry which is suitable for use in the slurry excavating method.

According to the present invention, the abovesaid objects are accomplished by employing an excavating slurry containing a water absorbing resin powder which absorbs water at least 10 times as much as its own weight and retains its shape without dissolving in water. This is easily accomplished especially when the powder is a composite power including inorganic particles, each coated over the entire surface area thereof with water absorbing resin.

DESCRIPTION OF THE PREFERRED EMBODIMENTS

Figure 1:
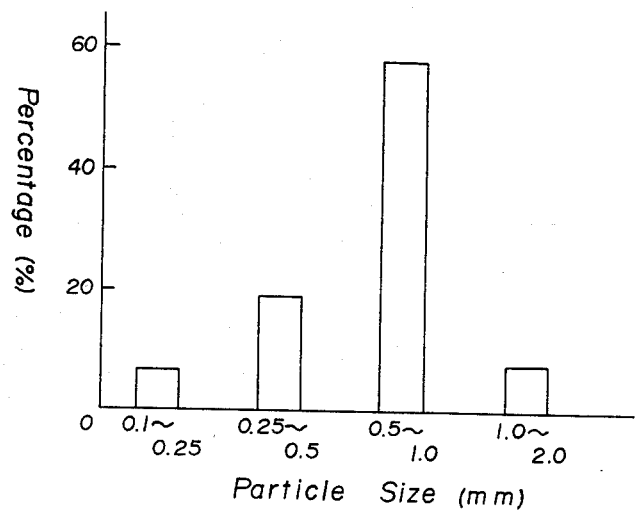
FIGS. 1 and 2 are graphs, each showing the distribution of the particle size of swollen particles of water absorbing resin powder when the particles were added as a lost water preventive material to 8% by weight of bentonite slurry in each of Examples 1 and 2, the abscissa representing the particle size (mm) and the ordinate the contents of the powder particles in percentage.

The water absorbing resin powder for use in the present invention is one that absorbs water at least 10 times, preferably tens to hundreds of times, more preferably from 20 to 500 times as much as its own weight, and is capable of retaining its shape when swollen, without dissolving in water. Since the contents of powder particles, when swollen, are mostly water, their specific gravity is substantially equal to that of water.

Accordingly, when dispersed in a slurry, the swollen powder particles are stably suspended in the slurry without surfacing or precipitating. When drilling gravel using a slurry added with the abovesaid water absorbing resin powder, coarse gaps in the gravel are filled with resin powder particles swollen by water and fine gaps are filled with other slurry components (clay, silt, bentonite and so forth) and, further, water sealing mud cakes are formed on the ditch wall and cutting area, or drilling hole, whereby the lost water phenomenon can be prevented.

Specific examples of water absorbing resin which can be used in the present invention are as follows:

(1) Resin obtained by heat treating modified polyvinyl alcohol containing a carboxyl radical, which is produced by reacting a cyclic anhydride, such as maleic anhydride, phthalic anhydride or trimellitic anhydride, with polyvinyl alcohol resin in a water-free state.

(2) Resin obtained by crosslinking a copolymer of $\alpha$-olefine, preferably, $\alpha$-olefine having a carbon number of 2 to 12, such as ethylene, propylene, butene-1, isobutylene or diisobutylene, and a maleic acid compound, such as maleic acid anhydride or its derivative, for example, maleic acid, maleinamic acid or maleinimide, or the copolymer neutralized with alkali.

(3) Resin obtained by crosslinking a copolymer of a polymerized vinyl compound, such as methyl vinyl ether, vinyl acetate or styrene, and a maleic acid compound, such as maleic anhydride or its derivative, or the copolymer neutralized with alkali.

(4) Resin obtained by polymerizing alkali metal acrylate or methacrylate with self-crosslinking.

(5) Resin obtained by saponifying a copolymer of vinyl ester and (meth)acrylate ester.

(6) Resin obtained by crosslinking polyvinyl alcohol resin, for example, with dialdehyde or using radioactive rays.

(7) Resin obtained by crosslinking polyethylene oxide using radioactive rays.

(8) Resin obtained by graft-polymerizing starch or cellulose with acrylonitrile through use of ceric salt or radioactive rays and by hydrolizing the graft polymer.

(9) Resin obtained by graft-polymerizing starch or cellulose with acrylic acid or maleic acid compound and crosslinking the graft polymer.

(10) Resin obtained by rendering starch or cellulose into the corresponding carboxymethyl derivative through use of monochloroacetic acid and crosslinking it with formalin or the like.

Of these resins, the water absorbing resins (1) to (6) are desirable because they are durable and heat-resisting, do not decay and are strong when swollen in a slurry. In particular, the water absorbing resins (1), (2), (3) and (4) are effective for preventing the lost water phenomenon. The reason therefor is not clear, but it is considered to be attributable to the strength and elasticity of a gel into which the water absorbing resin is rendered.

These water absorbing resins are each finely divided into a powder of appropriate particle size in accordance with the nature of the ground so that the powder particles, when having entrained water, may have a particle size necessary for preventing the lost water phenomenon. As described previously, when added to a slurry, the powder particles absorb much water and swell, and since the contents of the swollen powder particles are almost entirely water, their specific gravity is nearly equal to the specific gravity of the water; therefore, the swollen powder particles stably disperse in the slurry without surfacing or precipitating. Consequently, the powder particles plug the gaps in the ground by the circulation of the slurry and show the effect of preventing the lost water phenomenon. However the powder particles stably disperse in the slurry but, when allowed to stand for a long time, they may sometimes float to the surface of the slurry. To prevent this, it is preferable that the water absorbing resin powder is used in the form of a composite in combination with an inorganic powder of high specific gravity so that the specific gravity of the powder particles after having entrained water may be in the range of 1.02 to 1.25, preferably 1.05 to 1.15. As the abovesaid composite, it is preferred to use a water absorbing resin composite which is obtained by joining the aforementioned water absorbing resin powders (1) to (10) and an inorganic powder by heating or using adhesive binder, or a water absorbing resin composite which is produced by dissolving starting polymers of the aforesaid water absorbing resins (1) to (10) in a solvent (preferably, water) containing crosslinking agent, coating the resulting solution over the entire surface area of an inorganic powder, removing the solvent and crosslinking it by heating. Especially, the latter composite is preferable because the water absorbing resin and the inorganic powder are difficult to separate from each other during circulation of the slurry.

The following are preferred examples of the water absorbing resin composite in which the inorganic powder particles are entirely covered with the water absorbing resin.

(a) A water absorbing resin composite produced as follows: To an aqueous solution of a copolymer of $\alpha$-olefin, such as ethylene, propylene, butene-1, isobutylene or diisobutylene, preferably, $\alpha$-olefin having a carbon number of 2 to 12, and a maleic acid compound, such as maleic acid anhydride or its derivative for example, maleinamic acid or maleinimide, or alkali neutralized copolymer, are added, in an amount of 0.1 to 10 times as much as the weight of the copolymer, one or more inorganic powders having a specific gravity of 1.50 or more, such as bentonite, kaolinite and like swelling and nonswelling clay, quartz sand and so forth. The mixture is once molded into a film, fiber or some other configuration and, after being dried, it is subjected to crosslinking treatment and then ground to a powder of appropriate particle size, or the mold is pulverized prior to the crosslinking treatment.

(b) A water absorbing resin composite produced as follows: To an aqueous solution of a copolymer of a polymerized vinyl compound, such as methylvinyl ether, vinyl acetate or styrene, and a maleic acid compound, such as maleic acid anhydride or its derivative, or alkali neutralized copolymer, are added the abovesaid inorganic powders in an amount of 0.1 to 10 times, based on the weight of the copolymer. The mixture is once molded in the form of a film, fiber or the like and, after being dried, it is subjected to crosslinking treatment and then ground to a powder of proper particle size, or the mold is pulverized before the crosslinking treatment.

(c) A water absorbing composite obtained by polymerizing alkali metal acrylate or methacrylate in the presence of the abovesaid inorganic powder in an amount of 0.1 to 10 times based on the weight of the said unsaturated monomer wherein crosslinking occurs in the resulting polymer.

These powdered composites are not decomposed by microorganisms, and hence are preferable. Above all, the powdered composite (a) prepared from the copolymer of $\alpha$-olefin (in particular, isobutylene) and maleic anhydride, inorganic powder and polyvalent amine (as crosslinking agent, preferably polyethylene imine), is effective for preventing the lost water phenomenon in terms of durability of the water absorbing resin in the swollen state.

According to the present invention, since the particle size of the water absorbing resin or such composite powder after being swollen can be changed as desired by adjusting the particle size before swelling, it is possible to select resin powder of a particle size necessary for preventing the lost water in accordance with the nature of the ground to be excavated.

The water absorbing resin or composite powder obtained as described above is added to an excavating fluid and acts as a lost water preventive agent. The fluid consists principally of a slurry but it may also be composed of oil or emulsion instead of slurry. Such an excavating fluid composition is employed in bucket, clam,-bit, stationary and circulating type underground continuous wall methods, cast-in-place piling methods, such as earth drill method and anger method, and a ground investigating boring method, but it may also be used in a boring method for petroleum and natural gas.

The present invention will hereinafter be described concretely in connection with examples, but the invention is not limited specifically thereto.

EXAMPLE 1

Slurry for preventing lost water phenomenon was prepared as follows: Powder of a water absorbing resin (which is obtained by heat treating modified alcohol obtained by reacting polyvinyl alcohol with maleic acid anhydride in a water-free state), which absorbs pure water 250 times as much as its own weight and exhibits such a particle size distribution as shown in FIG. 1 when added to and swollen by 8 wt% bentonite slurry, was added to the 8 wt% bentonite slurry in the ratio of 0.1 wt% with respect to the latter.

On the other hand, as ground models for which it is difficult to form excellent mud cakes because of large quantities of lost water in the case of ordinary slurry, two kinds of glass bead grounds were prepared which were 45 cm² in plane area and had coefficients of permeability of $5 \times 10^{-2}$ cm/sec and $6 \times 10^{-1}$ cm/sec, respectively.

The abovesaid slurry and 8 wt% bentonite slurry for comparison were filled on the ground models and pressurized at a pressure of 0.5 Kg/cm². The quantity of lost water, the penetration distance of the slurry after five minutes of the pressurization and the thickness of mud cake formed after five minutes of the pressurization were measured values and are shown in Tables 1 and 2.

TABLE 1

| | | Quantity of lost water (ml) | |
|---|---|---|---|
| Slurry used | Time after pressurization | Coefficient of permeability of ground model used $5 \times 10^{-2}$ cm/sec | Coefficient of permeability of ground model used $6 \times 10^{-1}$ cm/sec |
| 8% bentonite slurry containing water absorbing resin | 30 sec | 120 | 182 |
| | 1 min | 132 | 196 |
| | 5 min | 134 | 203 |
| 8% bentonite slurry | 30 sec | from 1,000 up | from 1,000 up |
| | 1 min | — | — |
| | 5 min | — | — |

TABLE 2

| | | Ground model used | |
|---|---|---|---|
| Slurry used | Item of measurement | Coefficient of permeability of ground model $5 \times 10^{-2}$ cm/sec | Coefficient of permeability of ground model $6 \times 10^{-1}$ cm/sec |
| 8% bentonite slurry containing water absorbing resin | Penetration distance of slurry (cm) | 8.2 | 12 |
| | Thickness of mud cake formed (mm) | 2.6 | 3.2 |
| 8% bentonite slurry | Penetration distance of slurry (cm) | from 50 up | from 50 up |
| | Thickness of mud cake formed (mm) | 0* | 0* |

0*: Not mud cake formed.

As shown in Tables 1 and 2, in the case of using the bentonite slurry without the lost water preventive material, the slurry instantaneously penetrates into and flows out of the ground and no mud cake is formed. In contrast thereto, the bentonite slurry mixed with the powdered water absorbing resin stops penetration within 30 seconds after pressurization and a mud cake of several millimeters thick is formed.

EXAMPLE 2

Figure 2:
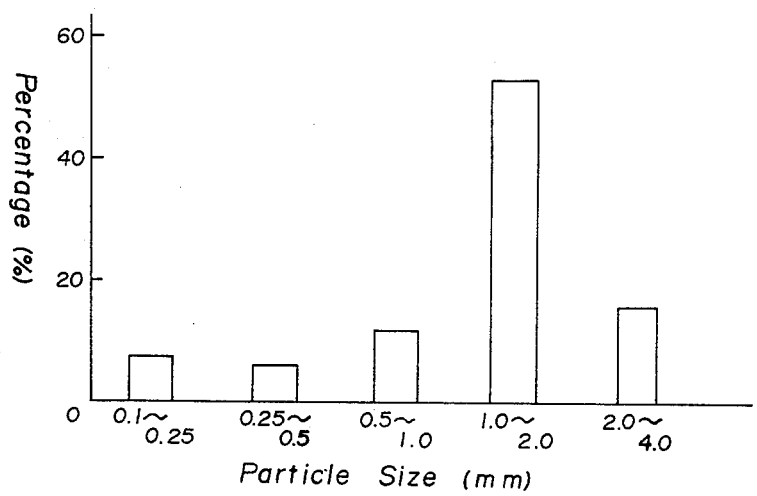

Slurry for preventing lost water was prepared as follows: Powder of a water-absorbing resin prepared from isobutylene-maleic acid anhydride copolymer, which absorbs pure water 200 times as much as its own weight and exhibits such a particle size distribution as shown in FIG. 2 when added to and swollen by 8 wt% bentonite slurry, was added to the 8 wt% bentonite slurry in the ratio of 0.1 wt% with respect to the latter.

The abovesaid slurry and 8 wt% bentonite slurry for comparison were filled on the two kinds of ground models used in Example 1 and pressurized at a pressure of 0.5 Kg/cm². The quantity of lost water, the penetration distance of the slurry after minutes of the pressurization and the thickness of mud cake formed after the pressurization were measured for each model; the measured values are shown in Tables 3 and 4.

TABLE 3

| | | Quantity of lost water (ml) | |
|---|---|---|---|
| Slurry used | Time after pressurization | Coefficient of permeability of ground model used $5 \times 10^{-2}$ cm/sec | Coefficient of permeability of ground used $6 \times 10^{-1}$ cm/sec |
| 8% bentonite slurry containing water absorbing resin | 30 sec<br>1 min<br>5 min | 136<br>140<br>146 | 168<br>172<br>176 |
| 8% bentonite slurry | 30 sec<br>1 min<br>5 min | from 1,000 up<br>—<br>— | from 1,000 up<br>—<br>— |

TABLE 4

| | | Ground model used | |
|---|---|---|---|
| Slurry used | Item of measurement | Coefficient of permeability of ground model $5 \times 10^{-2}$ cm/sec | Coefficient of permeability of ground model $6 \times 10^{-1}$ cm/sec |
| 8% bentonite slurry containing water absorbing resin | Penetration distance of slurry (cm) | 9.6 | 10.3 |
| | Thickness of mud cake formed (mm) | 2.8 | 2.8 |
| 8% bentonite slurry | Penetration distance of slurry (cm) | from 50 up | from 50 up |
| | Thickness of mud cake formed (mm) | 0* | 0* |

0*: No mud cake formed.

As shown in Tables 3 and 4, the bentonite slurry without the lost water preventive material instantaneously penetrates into and flows out of the ground and no mud cake is formed. In contrast thereto, the bentonite slurry containing water absorbing resin prepared from the isobutylene-maleic anhydride copolymer stops penetration within 30 seconds after pressurization and a mud cake several millimeters thick is formed.

EXAMPLE 3

(1) Preparation of water absorbing composite for use in this Example.

One hundred weight parts of an isobutylene-maleic acid anhydride copolymer (an alternating copolymer having a molar ratio 1:1 between isobutylene and maleic anhydride, and having a molecular weight of about 160000. R Isoban-10 by Kuraray Isoprene Chemical Inc.), 32 weight parts of sodium hydroxide (a quantity corresponding to that needed for rendering into salt form about 60 mol% of carboxyl radicals based on maleic acid anhydride of the copolymer) and 500 weight parts of water were stirred at 80° C., to prepare a homogeneous aqueous solution of sodium salt of the isobutylene-maleic anhydride copolymer. Then, polyethylene imine having a molecular weight of 1200 (Polyethylene imine SP-012 by Nihon Shokubai Co., Ltd.) was added to the aqueous solution so that the water absorption ratio per water absorbing resin after drying and heat treatment might be 140-times. Kaolin clay (NN kaolin by Tsuchiya Kaolin Kogyo Kabushiki Kaisha) was mixed with the aqueous solution in the ratio of 300 weight parts per 100 weight parts of the abovesaid copolymer. The mixed solution was dried on an iron of about 120° C. and then heat treated in a hot-blast drier at 160° C. for 16 hours. The resulting product was pulverized into powder particles passing through a 20-mesh wire cloth, the resultant water absorbing composite was placed in a beaker and mixed with 1000 g of distilled water and the dispersion was allowed to stand for two hours, after which it was filtered through a 200-mesh nylon cloth. The water absorption ratio of the composite, obtained by measuring its weight in the abovesaid water-containing state, was 45-fold the weight of the composite being before swollen. The specific gravity of the composite when swollen by water was 1.05.

(2) Preparation of excavating slurry

Excavating slurry was prepared by adding 0.1 wt% of the powdered composite obtained in (1) to a slurry containing 2 wt% of bentonite and 0.5 wt% of carboxylmethyl cellulose. The powdered composite was added stably dispersed in the slurry without surfacing.

(3) Lost water preventing test in excavating slurry

At first, excavating slurry (containing only 2 wt% of bentonite and 0.5 wt% of carboxylmethyl cellulose) with no water absorbing composite added thereto was supplied to an excavating field and the lost water phenomenon was checked in terms of variations in the quantity of slurry with time (the quantity of slurry reduced) while excavating the ground using a bucket type excavator. While excavating the ground where gravel was distributed 12 to 17 meters underground, the slurry decreased at a rate of 3.5 m³ per hour; a rapid lost water phenomenon was observed.

On the other hand, the lost water phenomenon was checked in the same excavation as mentioned above, using the excavating slurry prepared as described above in (2) (containing 0.1 wt% of the water absorbing resin-inorganic powdered compound). At the initial stage of excavating the abovesaid gravel, the slurry was lost at a rate of about 0.3 m³ per hour and, thereafter, the quantity of slurry lost gradually decreased; finally, the loss of slurry reached a steady state of 0.18 m³ per hour. It was observed that the lost water phenomenon was virtually prevented.

As a result of further excavation, there was, 22 to 35 meters underground, gravel in which the slurry was lost at a rate of 2.0 to 2.2 m³ per hour; but, in this case, too, it was observed that the quantity of slurry lost could be suppressed to a rate of 0.18 to 0.3 m³ per hour as in the abovesaid case.

What is claimed is:

1. A slurry excavating method for excavating ground or drilling a hole by means comprising introducing onto the ground or into the hole a slurry containing a powder of a water absorbing resin which is capable of absorbing at least 10 times its own weight in water and retaining its shape without dissolving when swollen by water, said water absorbing resin being a crosslinked copolymer of an α-olefin and a maleic acid compound selected from the group consisting of maleic acid, maleic acid anhydride, maleinamic acid and maleinimide, whereby loss of water from said slurry employed in said slurry excavating method is prevented.

2. A method according to claim 1 wherein the water absorbing resin is a crosslinked copolymer of an α-olefin and maleic acid anhydride.

3. A method according to claim 1 wherein the α-olefin is isobutylene.

4. A method according to claim 1 wherein the water absorbing resin is used as a composite of the water absorbing resin and inorganic powder particles to prevent the resin from floating to the surface of the slurry.

5. A method according to claim 4 wherein the composite is one in which the inorganic powder particles are entirely covered with the water absorbing resin.

6. A method according to claim 4 wherein the specific gravity of the composite after having absorbed water is in the range of 1.02 to 1.25.

7. A method according to claim 4 wherein the composite is obtained by adding the inorganic powder particles to an aqueous solution of the copolymer and a crosslinking agent for the copolymer, in a ratio of 0.1 to 10 wt % of the inorganic powder particles with respect to the weight of the copolymer, and dehydrating and heat treating the resultant mixture.

* * * * *